United States Patent
Jacobs et al.

(10) Patent No.: US 6,245,271 B1
(45) Date of Patent: Jun. 12, 2001

(54) REDUCED DIE LIP BUILDUP EXTRUSION OF POLYMER COMPOSITIONS

(75) Inventors: Rob Lee Jacobs, Woodstock, GA (US); Billy Ray Jones, Jr., Hendersonville, NC (US); Steven Edward Knothe, Roswell; Daniel Kenneth Schiffer, Marietta, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/447,015

(22) Filed: Nov. 22, 1999

Related U.S. Application Data

(60) Provisional application No. 60/112,804, filed on Dec. 18, 1998.

(51) Int. Cl.[7] ............................ B29C 47/06; B29C 67/20; B29C 55/06
(52) U.S. Cl. ................. 264/154; 264/173.12; 264/210.6; 264/211; 264/288.8
(58) Field of Search ............................... 264/154, 173.12, 264/211, 210.6, 288.8

(56) References Cited

U.S. PATENT DOCUMENTS

| 3,276,944 | 10/1966 | Levy . |
| 3,338,992 | 8/1967 | Kinney . |
| 3,341,394 | 9/1967 | Kinney . |
| 3,377,655 | 4/1968 | Kucharski et al. . |

(List continued on next page.)

FOREIGN PATENT DOCUMENTS

| 803714 | 1/1969 | (CA) . |
| 4310082 | 9/1994 | (DE) . |
| 2296216 | 6/1996 | (GB) . |
| 58012743 | 1/1983 | (JP) . |
| 97/04955 | 2/1997 | (WO) . |

OTHER PUBLICATIONS

NRL Report 4364, "Manufacture of Super–Fine Organic Fibers" by B. A. Wendt, E. L. Boone and C. D. Fluharty (1954).
NRL Report 5265, "An Improved Device for the Formation of Super–Fine Thermoplastic Fibers" by K. D. Lawrence, R. T. Lukas, J. A. Young (1959).

*Primary Examiner*—Leo B. Tentoni
(74) *Attorney, Agent, or Firm*—William D. Herrick; William W. Letson

(57) ABSTRACT

Process for die extrusion of melted polymers that reduces die lip buildup and its deleterious effects. Direct extrusion of mixed polymer pellets and filler concentrate pellets in one embodiment avoids a precompounding step and reduces the tendency of polymer and filler particles to adhere to the exit portion of the die. In other embodiments a reduced die lip radius and lower melt processing temperatures further enhance the benefits obtained. For co-extruded muitilayer film embodiments elimination of fillers and antiblock additives in skin layers add to the levels of die lip buildup reduction obtained. Hours of continuous operation without excessive die lip buildup in one arrangement have been increased from a level of 4 to 6 hours, for example, to in excess of 20 hours. Reduced product defect levels have also been attained.

16 Claims, 2 Drawing Sheets

U.S. PATENT DOCUMENTS

| | | |
|---|---|---|
| 3,502,538 | 3/1970 | Petersen . |
| 3,502,757 | 3/1970 | Spencer . |
| 3,502,763 | 3/1970 | Hartmann . |
| 3,542,615 | 11/1970 | Dobo et al. . |
| 3,647,346 | 3/1972 | Minnie . |
| 3,676,242 | 7/1972 | Prentice . |
| 3,692,618 | 9/1972 | Dorschner et al. . |
| 3,734,984 | 5/1973 | Hoffman . |
| 3,767,523 | 10/1973 | Schwarz . |
| 3,802,817 | 4/1974 | Matsuki et al. . |
| 3,829,274 | 8/1974 | Melead . |
| 3,832,120 | 8/1974 | Shaffer . |
| 3,847,516 | 11/1974 | Hoffman . |
| 3,849,241 | 11/1974 | Butin et al. . |
| 4,041,203 | 8/1977 | Brock et al. . |
| 4,282,177 | 8/1981 | Kurtz et al. . |
| 4,340,563 | 7/1982 | Appel et al. . |
| 4,413,973 | 11/1983 | Peters . |
| 4,494,629 | 1/1985 | Raeburn . |
| 4,522,203 | 6/1985 | Mays . |
| 4,734,324 | 3/1988 | Hill . |
| 5,008,056 | 4/1991 | Kurtz et al. . |
| 5,382,400 | 1/1995 | Pike et al. . |
| 5,417,907 | 5/1995 | Ohhata et al. . |
| 5,435,708 | 7/1995 | Kaun . |
| 5,458,836 | 10/1995 | Rakestraw et al. . |
| 5,505,609 | 4/1996 | Cloeren et al. . |
| 5,539,076 | 7/1996 | Nowlin et al. . |
| 5,655,948 | 8/1997 | Yapel et al. . |
| 5,705,111 | 1/1998 | Blemberg et al. . |
| 5,720,986 | 2/1998 | Gohlisch et al. . |
| 5,851,137 | 12/1998 | Bhave et al. . |

REDUCED DIE LIP BUILDUP EXTRUSION OF POLYMER COMPOSITIONS

This application claims priority from U.S. Provisional Patent Application Ser. No. 60/112,804 filed Dec. 18, 1998.

FIELD OF THE INVENTION

The present invention is directed to processes for the die extrusion of polymers and resulting extruded products. The process of the invention permits extended run times without shutting down the extrusion line for clean-up due to die lip build-up and improves resulting products.

BACKGROUND OF THE INVENTION

Many products today require highly engineered components and yet, at the same time, must be produced at a cost consistent with limited use or disposability. By limited use or disposable, it is meant that the product and/or component is used only a small number of times or possibly only once before being discarded. Examples of such products include, but are not limited to, surgical and health care related products such as surgical drapes and gowns, disposable workwear such as coveralls and lab coats and personal care absorbent products such as diapers, training pants, incontinence garments, sanitary napkins, bandages, wipes and the like. All of these products can and do utilize as components, films and fibrous nonwoven webs. While both materials are often used interchangeably, films tend to have greater barrier properties, especially to liquids, while fibrous nonwovens webs have, among other things, better tactile, comfort and aesthetic properties. When these materials are used in limited use and/or disposable products, the impetus for maximizing engineered properties while reducing cost is extremely high. To this end, it is often desirable to use either a film or a nonwoven to achieve the desired results because the combination often becomes more expensive. In the area of films, there have been previous attempts to make multi-layer films with reduced thicknesses. One advantage in forming multilayer films is that specific properties can be designed into the film, and, by making the films multilayer, the more costly ingredients can be relegated to the outer layers where they are most likely to be needed.

In addition, in the production of a breathable filled film it is common to employ a significant percent (by weight) of filler such as, for example, calcium carbonate. As is known in the art, stretching of the filled film creates a fine pore network which allows the film to continue to act as a barrier to liquids and particulate matter yet allows air and water vapor to pass therethrough. In order to obtain more uniform barrier and vapor transmission properties throughout the film it is desirable to have the filler equally distributed throughout the film. Thus, although such breathable barriers may act as a barrier to liquids and particulate matter they may themselves be a source of unwanted particles (i.e. the filler) which can be a source of die lip contamination and buildup. This filler accumulation and/or detachment may also be an undesirable cause of defects in various applications or articles employing the barrier fabric. A filled film which retains good breathability and low defect levels produced without die lip buildup is therefore desirable. In this regard, there exists a continuing need for a multilayer film having outer layers with little or no filler, yet which does not significantly reduce the breathability of the multilayer film. Moreover, many filled films fail to provide good adhesion to additional layers, such as, for example, nonwoven fabrics. Multilayer films which are capable of providing good adhesion to a support fabric without loss of breathability are likewise needed.

As mentioned, production of such films and nonwovens has, however, been accompanied by persistent problems of buildup of the composition being extruded on the die tip causing machine downtime for cleanup, frequently after only a few hours of operation. Various mechanisms are known to facilitate the cleaning and maintenance of dies used for the extrusion of polymer materials, while minimizing downtime. Molten polymers are extruded through dies to form films, strands, nonwoven webs, and other finished polymer forms. Particularly with polymer compositions containing fillers, as polymer exits the die, some of the polymer composition clings to the die openings or "lips," accumulating on the exterior surface of the die. This die lip build-up gradually increases until it accumulates to a point where it breaks off, possibly causing a defect in the product, which can be, for example, in the form of thin spots or tears or otherwise deleterious effects on the texture or other esthetic properties of the product. Considerable engineering goes into the design of dies and selection of extrusion compositions to minimize this build-up. Diverging, converging, radiused, and angled die lip geometries all are examples of methods developed to minimize this build-up. However, no die design completely eliminates it. It is common practice to temporarily halt the extrusion operation to perform maintenance on the die to remove this build-up.

U.S. Pat. No. 5,435,708, issued to Kaun, discloses a melt blowing die head with opposing die lips mounted on lip guides pivotally connected to respective setback bars. To facilitate cleaning and maintenance of the die, the lips can be swung away from the spinnerette on the respective lip guides. This allows for reduced down time during maintenance of the die, but does not permit maintenance during operation of the line.

U.S. Pat. No. 5,720,986, issued to Gohlisch et al., discloses an extrusion head having a stationary part fixed on an extrusion installation. The installation includes a plurality of extrusion cylinders. The stationary part has flow channels, each in communication with a respective extrusion cylinder and a common extrusion die. Two pivotal outer parts hinged on the stationary part are selectively swingable individually between open and closed positions. The outer parts define an extrusion orifice for the die in their closed position. When the outer parts are opened, maintenance can be performed on the die.

U.S. Pat. No. 4,413,973, issued to Peters, discloses a die which has a removable extrusion plate covering the die head. The plate can be removed and replaced to minimize downtime required for maintenance.

Co-assigned U.S. patent application Ser. No. 09/075,510 filed May 8, 1998 to Cook entitled "Extrusion Die System with Removable Insert" describes an insert for cleaning die tips "on the fly".

Also, the selection of polymer compositions and extruded structures has been varied in an effort to minimize die lip buildup. For example, co-assigned U.S. patent application Ser. No. 08/882,715 to McCormack et al. entitled "Low Gauge Films and Film/Nonwoven Laminates" filed Jun. 25, 1997 and incorporated herein in its entirety by reference describes film structures having thin outer skins that reduce die lip buildup.

A common feature of the prior art devices and processes is that routine cleaning and maintenance requires at least some downtime. While efforts have been made to reduce maintenance and downtime, it remains a goal to further increase operating times between required cleanings.

SUMMARY OF THE INVENTION

The present invention is directed to die extrusion of products such as films and nonwovens. The films may be made by conventional film forming techniques such as cast and blown co-extrusion film forming processes and the nonwovens by conventional processes such as spunbonding and meltblowing. The films in a particular embodiment are created with a core layer made from an extrudable thermoplastic polymer with the core layer defining a first exterior surface and a second exterior surface. In basic embodiments of the present invention, the core layer may have a first skin layer attached to the first exterior surface of the core layer and a second skin layer attached to the second exterior surface of the core layer. In such situations the first skin and the second skin layer may have a combined thickness which does not exceed about 15 percent of the overall thickness and more desirably for applications requiring breathability, neither the first skin thickness nor the second skin thickness exceeds more than about 7.5 percent of the overall thickness of the multilayer film. If desired, one or more of the layers may contain other additives such as, for example, a particulate filler. Most typically, such fillers will be primarily utilized in the core layer in, for example, a weight percent of at least about 40 percent, based upon the total weight of that particular layer, more preferably about 40 percent to about 70 percent by weight. Typically such breathable multilayer films will have water vapor transmission rates of at least 300 grams per square meter per 24 hours (g/m$^2$/day) and frequently much higher depending on the application.

Such films, nonwovens and laminates have a wide variety of uses including, but not limited to, applications in personal care absorbent articles including diapers, training pants, sanitary napkins, incontinence devices, bandages and the like. These same films and laminates also may be used in items such as surgical drapes and gowns as well as various articles of clothing either as the entire article or simply as a component thereof.

In accordance with the invention the extrudate is from a pellet mixture that avoids prior art precompounding steps, and in certain embodiments a particular die lip radius and unfilled skin layer in a co-extruded structure are employed. Reduced melt temperatures also enhance the benefits of the invention.

DETAILED DESCRIPTION OF THE INVENTION

The present invention is directed to die extruded products such as fibrous nonwoven webs and multilayer films, that is, films having two or more layers, for example.

While it will be exemplified in terms of multilayer film extrusion, those skilled in the art will recognize that the invention also applies to extrusion of other products that extrude through a die, such as meltblown nonwovens.

Figure 1:
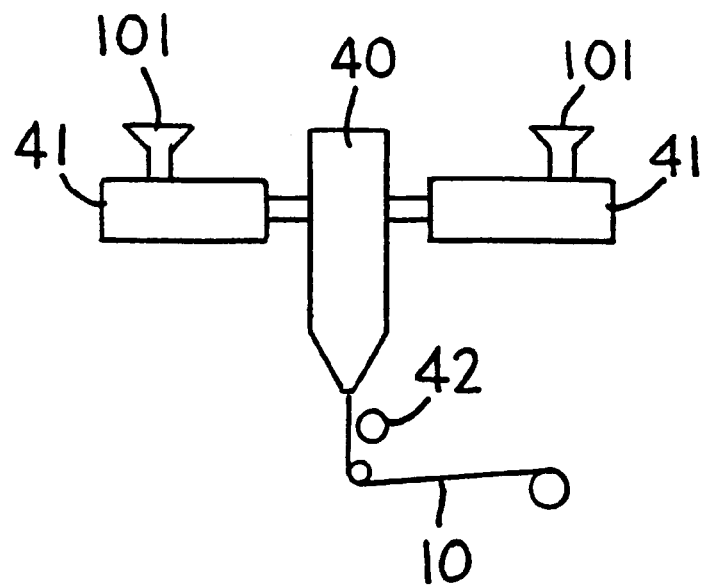
FIG. 1 is a schematic illustration of a multilayer film extrusion process.

FIG. 1 schematically illustrates a multilayer film extrusion process. Pellets (not shown) of polymer and filler concentrate are mixed and fed to extruders 41 at feed locations 101. Extruders 41 further mix and melt the polymer composition and filler concentrate pellets and supply them to cast film former 40 which co-extrudes the composition into multilayer film 10 directed to chill roll 42.

Figure 2:
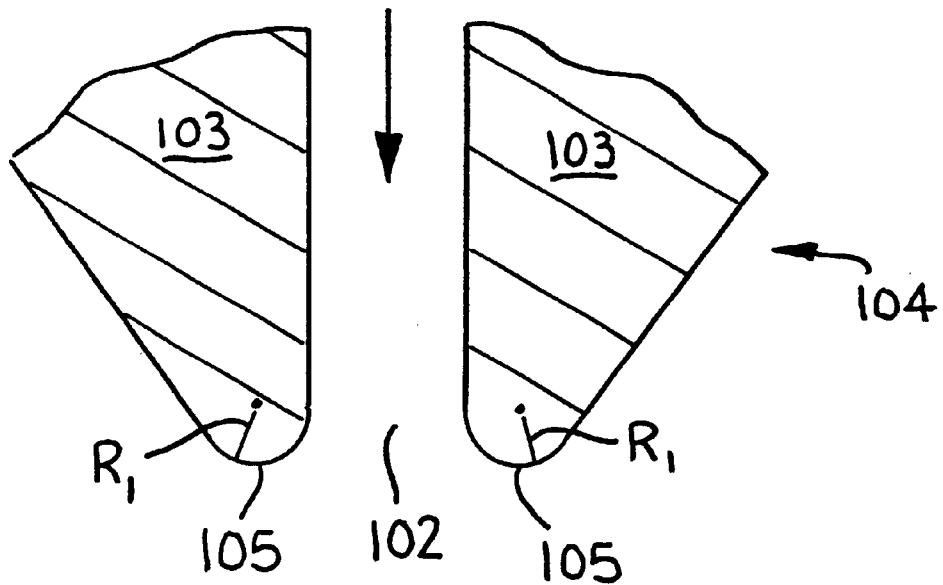
FIG. 2 is a schematic cross-section of a film extrusion die tip of the prior art.

FIG. 2 schematically illustrates a die lip typical of prior art devices. In this case, the polymer composition (which may be in multilayer combined form) travels in the direction of the arrow to exit point 102 formed by sides 103 of die 104. The die lip is formed by the ends 105 which have a radius of curvature $R_1$. Prior art devices have often had a radius of curvature, $R_1$, in the range of, for example, 8 to 12 mils and made from carbon steel coated with a strain resistant material such as chrome.

Figure 3:
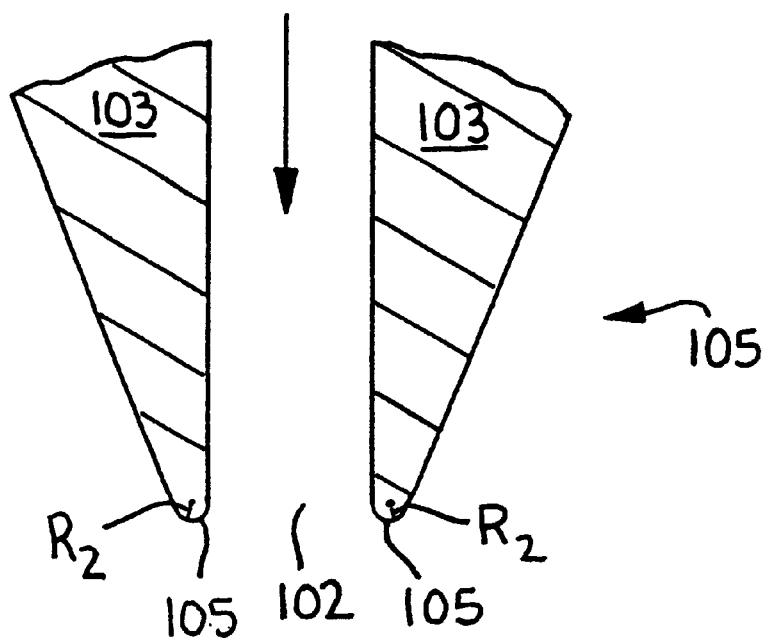
FIG. 3 is a schematic cross-section of a film extrusion die tip useful in the present invention.

FIG. 3 is a view like that of FIG. 2 except in this case die 105 has a radius of curvature, $R_2$, in the range, for example, of about 0.5 to 3 mils. In this case, die 105 may be formed of, for example, a less durable but corrosion resistant stainless steel.

Figure 4:
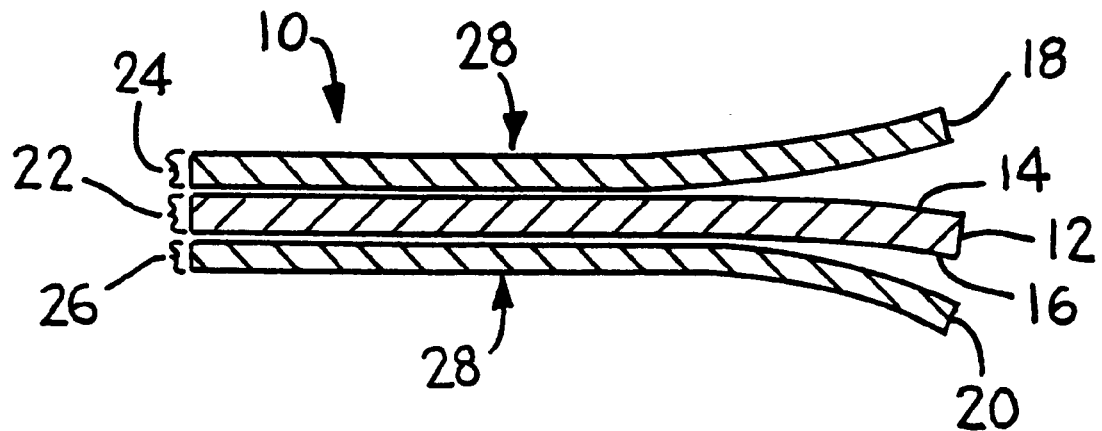
FIG. 4 is a cross-sectional side view of a multilayer film according to the present invention.

Referring to FIG. 4, there is shown, not to scale, a multilayer film 10 which, for purposes of illustration, has been split apart at the right side of the drawing. The multilayer film 10 includes a core layer 12 made from an extrudable thermoplastic polymer such as a polyolefin, including copolymers and/or blends thereof. The core layer 12 has a first exterior surface 14 and a second exterior surface 16. The core layer also has a core thickness 22. Attached to the first exterior surface 14 of the core layer 12 is a first skin layer 18 which has a first skin thickness 24. Attached to the second exterior surface 16 of the core layer 12 is an optional second skin layer 20 which has a second skin thickness 26. In addition, the multilayer film 10 has an overall thickness 28. Such multilayer films 10 can be formed by a wide variety of processes well known to those of ordinary skill in the film forming industry. Two particularly advantageous processes are cast film co-extrusion processes and blown film co-extrusion processes. In such processes, the two or three layers are formed simultaneously and exit the die in a multilayer form. Due to the extremely thin nature of the multilayer films according to the present invention such co-extrusion processes will most likely prove to be the most advantageous though it also may be possible to form multilayer films using separate extrusion processes. For more information regarding such processes, see, for example, U.S. Pat. No. 4,522,203; 4,494,629 and 4,734,324, each of which is incorporated herein by reference in its entirety.

To further reduce the cost of the core layer 12 and/or for breathability one or more types of fillers may be added, in many cases, to the core layer polymer extrusion blend. Both organic and inorganic fillers may be used. The fillers should be selected so as to not chemically interfere with or adversely affect the extruded film. These fillers can be used to reduce the amount of polymer being used for the core layer 12 and/or to impart particular properties such as breathability and/or odor reduction. Examples of fillers can include, but are not limited to, calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, baking soda, pulp powder, wood powder, cellulose derivatives, polymer particles, chitin and chitin derivatives.

The amount of filler that can be used resides within the discretion of the end-user, however, additions of from 0 to 80 percent by weight based upon the total weight of the core layer 12 are possible. In accordance with one aspect of the invention, the filler is formed as concentrate pellets in a polymer concentration. The filler in such concentrate pellets may be even higher, for example, up to 90 percent or, in some cases, 95 percent as the filler will be diluted in the final extrudate. Generally the fillers will be in particulate form and usually will have somewhat of an irregular shape with average particle sizes in the range of about 0.1 to about 7 microns. The term "particle size" as used herein refers to the longest single dimension of the particle. Furthermore, if sufficient filler is used in combination with sufficient stretching of the multilayer film 10, then voids can be created around the particles contained within the core layer 12 thereby making the core layer breathable. Loadings of about 40 to about 70 percent by weight of the core layer 12 when combined with stretching provides films which have good breathability. Such breathable films will generally have Water Vapor Transmission Rates (WVTR) as measured by ASTM Standard E9680, in excess of 300 grams per square meter per 24 hours (g/m$^2$/day) and more desirably WVTRs in excess of 800 g/m$^2$/day, 2000 g/m$^2$/day, 3000 g/m$^2$/day, and even 4000 g/m$^2$/day.

The skin layers 18 and 20 will typically include extrudable thermoplastic polymers and/or additives which provide specialized properties to the multilayer film 10. Thus, the first skin layer 18 and/or the second skin layer 20 may be made from polymers which give such properties as antimicrobial activity, water vapor transmission, adhesion and/or antiblocking properties. Thus, the particular polymer or polymers chosen for the skin layer 18 and 20 will depend upon the particular attributes desired. Examples of possible polymers that may be used alone or in combination include homopolymers, copolymers and blends of polyolefins as well as ethylene vinyl acetate (EVA), ethylene ethyl acrylate (EEA), ethylene acrylic acid (EAA), ethylene methyl acrylate (EMA), ethylene butyl acrylate (EBA), polyester (PET), nylon (PA), ethylene vinyl alcohol (EVOH), polystyrene (PS), polyurethane (PU) and olefinic thermoplastic elastomers which are multistep reactor products wherein an amorphous ethylene propylene random copolymer is molecularly dispersed in a predominately semicrystalline high polypropylene monomer/low ethylene monomer continuous matrix.

In applications where good breathability (i.e. high WVTR) is desired, the skin layers preferably comprise, at least in part, an extrudable water vapor transmissive polymer; examples include, but are not limited to, ethylene-vinyl acetate, ethylene-methyl acrylate, polystyrene, polyurethane, polyamide and mixtures thereof. The EVA and EMA copolymers preferably contain no more than about 80 percent ethylene by weight of the copolymer. Desirably the skin layer(s) comprise from about 30 percent to 100 percent water vapor transmissive polymer and from 0 to about 70 percent by weight a polyolefin based polymer, and even more desirably the vapor transmissive polymer can comprise from about 40 percent to about 60 percent by weight of the skin layer. Additionally, the skin layer may comprise two or more water vapor transmissive polymers such as, for example, 30 percent to 70 percent by weight EVA or EMA with 30 percent to 70 percent by weight polystyrene.

In addition, it may be desirable to add an anti-block material to improve processing and/or prevent unwanted adhesion of a tacky skin layer to other surfaces; as an example, some skin layers will adhere to the multilayer film itself when wound on a roll. Thus, it will often be desirable to add from 0 to about 10 percent anti-block material to the skin layers, and even more desirable from about 0.5 to about 5 percent by weight. Particulate matter such as diatomaceous earth can be added to the skin layers, although other antiblock materials may be used including, but not limited to, ground silica. Desirably the anti-block particles comprise particles having a median particle size of about 6–10 microns. In cases where winding in a roll is not necessary antiblock additives may be omitted, and it is a feature of the present invention that reduced die lip buildup results are further enhanced in such cases. See in this regard, for example, the in-line forming process described in co-assigned provisional U.S. patent application Ser. No. 60/101,306 to Bradley et al. entitled "Process for Making a Laminate of Unaged Film and an Unaged Nonwoven Web and Products Produced Therefrom" filed Sep. 22, 1998, incorporated herein in its entirety.

Oftentimes it may be desirable to laminate the multilayer film 10 to one or more substrates or support layers such as a nonwoven web. The core layer may not have sufficient adhesive or attachment properties so as to make it readily bondable to the support layer. As a result, the first skin layer 18 may comprise a polymer or polymers which exhibit higher adhesive properties and/or a lower tack point than the core layer 12.

A desired result particularly for personal care applications is to achieve a very low overall film thickness and, importantly, skin layers which are only a small percentage of the overall thickness of the multilayer film 10. In three layer film constructions in such cases the combined thickness of the first skin layer 18 and second skin layer 20 frequently will not exceed 15 percent of the overall thickness and, generally, the first skin layer 18 frequently will not exceed more than 7.5 percent and even more desirably each skin layer does not exceed over 5 percent of the overall film thickness 28. The same is also true with respect to the second skin layer 20. In a further aspect, the skin layer or layers may each have an individual thickness 24, 26 less than about 2 microns, desirably less than about 1.0 microns and still more desirably less than about 0.5 microns. As a result, the core thickness 22 comprises at least 85 percent of the overall thickness 28 and the first skin layer 18 and second skin layer 20 each generally will comprise no more than 7.5 percent of the overall thickness 28. Generally, it has been possible to create thinned films with overall thicknesses, about 30 microns or less and in certain applications with skin layers that do not exceed two microns. Desirably, the overall thickness 28 is less than about 25 microns and even more desirably less than about 20 microns. This is made possible by first forming a multilayer film 10 and then stretching or orienting the film in the machine direction, as explained in greater detail below, such that the resultant multilayer film 10 has increased strength properties in the machine direction or "MD", i.e., the direction which is parallel to the direction of the film as it is taken off the film extrusion equipment.

The resultant film can, if desired, be laminated to one or more support layers such as fibrous nonwoven webs. The manufacture of such fibrous nonwoven webs is well known to those of ordinary skill in the art of nonwoven manufacturing. Such fibrous nonwoven webs can add additional properties to the multilayer film 10, such as a more soft, cloth-like feel. This is particularly advantageous when the multilayer film 10 is being used as a barrier layer to liquids in such applications as outer covers for personal care absorbent articles and as barrier materials for hospital, surgical, and cleanroom applications such as, for example, surgical drapes, gowns and other forms of apparel.

Attachment of the support layers to the first skin layer 18 and second skin layer 20 may be by the use of a separate adhesive such as hot-melt and solvent based adhesives or through the use of heat and/or pressure as with heated bonding rolls. As a result, it may be desirable to design either or both the first skin layer 18 and the second skin layer 20 so as to have inherent adhesive properties to facilitate the lamination process.

A particularly advantageous support layer is a fibrous nonwoven web. Such webs may be formed from a number of processes including, but not limited to, spunbonding, meltblowing, hydroentangling, air-laid and bonded carded web processes. Meltblown fibers are formed by extruding molten thermoplastic material through a plurality of fine, usually circular, die capillaries as molten threads or filaments into a high velocity usually heated gas stream such as air, which attenuates the filaments of molten thermoplastic material to reduce their diameters. Thereafter, the meltblown fibers are carried by the high velocity usually heated gas stream and are deposited on a collecting surface to form a web of randomly dispersed meltblown fibers. The meltblown process is well-known and is described in various patents and publications, including NRL Report 4364, "Manufacture of Super-Fine Organic Fibers" by B. A. Wendt, E. L. Boone and C. D. Fluharty; NRL Report 5265, "An Improved Device For The Formation of Super-Fine Thermoplastic Fibers" by K. D. Lawrence, R. T. Lukas, J. A. Young; U.S. Pat. No. 3,676,242, issued Jul. 11, 1972, to Prentice; and U.S. Pat. No. 3,849,241, issued Nov. 19, 1974, to Buntin, et al. The foregoing references are incorporated herein by reference in their entirety.

Spunbond fibers are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well-known spunbonding mechanisms. The production of spunbond nonwoven webs is illustrated in patents such as Appel et al., U.S. Pat. No. 4,340,563; Matsuki, et al, U.S. Pat. No. 3,802,817; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; U.S. Pat. No. 5,382,400 to Pike et al.; and Harmon, Canadian Patent Number 803,714. All of the foregoing references are incorporated herein by reference in their entirety. A 10 to 70 grams per square meter (gsm) spunbond web such as, for example, polypropylene fibers, is an exemplary support fabric.

Multilayer support layers also may be used. Examples of such materials can include, for example, spunbond/meltblown laminates and spunbond/meltblown/spunbond laminates such as are taught in Brock et al., U.S. Pat. No. 4,041,203 which is incorporated herein by reference in its entirety.

Bonded carded webs are made from staple fibers which are usually purchased in bales. The bales are placed in a picker which separates the fibers. Next the fibers are sent through a combing or carding unit which further breaks apart and aligns the staple fibers in the machine direction so as to form a machine direction-oriented fibrous nonwoven web. Once the web has been formed, it is then bonded by one or more of several bonding methods. One bonding method is powder bonding wherein a powdered adhesive is distributed throughout the web and then activated, usually by heating the web and adhesive with hot air. Another bonding method is pattern bonding wherein heated calender rolls or ultrasonic bonding equipment is used to bond the fibers together, usually in a localized bond pattern though the web can be bonded across its entire surface if so desired. When using bicomponent staple fibers, through-air bonding equipment is, for many applications, especially advantageous.

A process for forming the multilayer film 10 is shown in FIG. 1 of the drawings. Referring to the figure, the multilayer film 10 is formed from a co-extrusion film apparatus 40 such as a cast or blown unit as was previously described above. Typically the apparatus 40 will include two or more polymer extruders 41. In accordance with one aspect of the present invention, reduced melt temperatures are used and have been found to contribute to reduced die lip buildup. While it is not intended to limit the invention to a particular theory, it is believed that lower shear effects and reduced thermal degradation of the polymers result and the tendency for the extrudate to accumulate on the die lip also is reduced. These benefits have been obtained, for example, by operating within a range of up to about 135° C. above the lowest melting component. As will be apparent to those skilled in the art, compositions and equipment configurations may be selected so as to maximize operation at these lower temperatures. The multilayer film 10 is extruded onto a chill roller 42 which may be patterned so as to impart a pattern to the newly formed film 10. This is particularly advantageous to reduce the gloss of the film and give it a matte finish. Using a three layer film construction such as is shown in FIG. 4, typically the multilayer film 10, as initially formed, will have an overall thickness 28 of approximately 40 microns or greater with the first skin layer 18 and each skin layer 20 having an initial thickness of 3 microns or greater which collectively may be approximately 15 percent of the overall initial thickness in a construction as in FIG. 4.

From the co-extrusion film apparatus 40 the film 10 may be directed to a film stretching unit (not shown) such as a machine direction orienter or "MDO" which is a commercially available device from vendors such as the Marshall and Williams Company of Providence, Rhode Island. Such an apparatus has a plurality of stretching rollers which stretch and thin the multilayer film 10 in the machine direction of the film which is the direction of travel of the film 10 through the process. After exiting the film stretching unit, the film 10 for personal care disposable product applications may have a maximum thickness of approximately 30 microns and each of the skin layers may have a maximum thickness of no more than about 2 microns which in turn is collectively less than about 15 percent of the overall film and more desirably less than 10 percent of the overall film thickness.

As has been stated previously, the multilayer film 10 and the laminates including it may be used in a wide variety of applications not the least of which includes personal care absorbent articles such as diapers, training pants, incontinence devices and feminine hygiene products such as sanitary napkins.

Other uses for the multilayer film and multilayer film/support layer laminates according to the present invention include, but are not limited to, surgical drapes and gowns, wipers, barrier materials and articles of clothing or portions thereof including such items as workwear and lab coats.

EXAMPLES

All the example films were three layer cast films, with the two outer or skin layers in each example being the same although they varied in some cases from example to example.

Example 1 (Comparative)

In Example 1 the core layer was formed from previously compounded pellets of a single composition including, on a weight percent basis based upon the total weight of the layer, 50 percent FL 2029® calcium carbonate with a 1 micron average particle size and a 7 micron top cut. The calcium carbonate was obtained from English China Clay and had a coating of 1.2 percent behenic acid. The core layer also included 45 percent NG 3310 linear low density polyethylene (LLDPE) from the Dow Chemical Company, 4.8 percent 4012 low density polyethylene from Dow and 0.2 percent of antioxidant B900 from Ciba Specialties Company of Tarrytown, N.Y.

The two outer or skin layers on opposite sides of the core layer comprised 45.1 percent Himont KS357P Catalloy™ polymer from Himont U.S.A., 4 percent diatomaceous earth antiblock, 0.5 percent B900 antioxidant, and 50.4 percent Exxon 768.36 (28 percent EVA copolymer). The Himont Catalloy™ polymer is an olefinic thermoplastic elastomer or TPO multistep reactor product wherein an amorphous ethylene propylene random copolymer is molecularly dispersed in a predominately semicrystalline high polypropylene monomer/low ethylene monomer continuous matrix. The antiblock comprised Superfloss® diatomaceous earth. Superfloss® diatomaceous earth antiblock is available from Celite Corporation. Exxon 768.36 is available from the Exxon Chemical Company of Houston, Tex.

The die lip radius was about 8 to 12 mils and the equipment used was as described in the previously described Bradley et al. application. The three layer film was extruded using cast extrusion equipment of the type described above. The exiting melt temperature for the skin layers was measured to be 450° F. and for the core was 430° F. This process typifies prior multilayer film extrusion processes which historically have had excess extrusion die lip buildup after about 4 to 6 hours of running time. Excessive die lip buildup is determined based on product specifications relating to, for example, hole or other defect levels in terms of size and/or frequency. While the economics of the process will dictate particular values, the present invention will differentiate by improved results regardless of the specific numbers involved in substantially all cases. The same standards were used in each of the Examples.

Example 1A

Example 1 was repeated except that the die lip radius of curvature was reduced to about 1 mil. Based on two runs, the time to excessive die lip buildup was in the range 3 to 4 hours and 6 to 8 hours.

Example 2

Example 1A was repeated except that no antiblock was included in the skin layers which then constituted 50.4 percent Exxon 768.36, 0.5 percent antioxidant, and 49.1 percent Cattaloy KP 357P. The average time to excessive die lip build-up was about 12 hours.

Example 3

In Example 3 the core layer was, on a weight percent basis based upon the total weight of the layer, 67 percent of one pellet form containing 75 percent ECC Supercoat® calcium carbonate, 20 percent Dow 2517 linear low density polyethylene, 4.8 percent Dow 4012 low density polyethylene and 0.2 percent Ciba B900. These pellets were mixed with 33 percent of pellets of 100 percent Dow 2047 AC linear low density polyethylene, and the pellet mixture fed directly to the extruder. The precompounding step of the earlier examples was avoided.

The two outer or skin layers on opposite sides of the core layer comprised the compositions of Example 1A including the Superfloss® antiblock.

The three layer film was extruded using cast extrusion equipment of the type described above. In this case the exiting melt temperature from the extruder for the skin layers was 410° F. and the melt temperature for the core layer was 400° F. In this case the extrusion continued for 5 hours without significant evidence of die lip buildup. This run was discontinued as described in the following example.

Example 4

The Example 3 run was continued except that the antiblock supply to the skin layers was discontinued, and the skin layers then had the composition of Example 2. The 5 hour run of Example 3 continued for an additional 15 hours without significant die lip buildup when it was discontinued because the supply of extrudate was exhausted.

Thus, it has been determined that in accordance with the invention it is possible to run die extrusion processes for an extended period without excessive die lip buildup necessitating cleaning of the die tip and process interruption. As is apparent, this represents very substantial cost savings and is highly advantageous. Moreover, in accordance with the invention these results can be obtained with extrudates that are inexpensive and represent additional opportunities for cost savings. While the invention is not to be limited by any particular theory, it is believed possible that the avoidance of prior compounding of the extrudate before addition to the extruder results in reduced thermal degradation and in a molecular weight distribution that provides viscosity and other attributes that facilitate extrusion and permit additional benefits to be obtained from reduced radius of curvature die lip configurations, reduced melt temperatures, and filler-free skin layer compositions, for example.

While the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such alterations, modifications or other changes be encompassed by the claims.

We claim:

1. Process for melt extrusion of thermoplastic articles with reduced die lip buildup comprising the steps of:

a. providing at least two sources of compositions containing molten thermoplastic polymer, b. combining said compositions within a die into layers wherein one of said layers is exposed and comprises no more than 15% of the total thickness of said layers; and c. extruding said combined layers through die lips forming the exit of said die;

wherein said die lips have a radius of curvature in the range of from about 0.5 mil to about 3 mils.

2. The process of claim 1 wherein the temperature of said combined layers at the time of extrusion is no higher than about 135 Centigrade degrees above the melting point of the lowest melting component of said composition.

3. The process of claim 1 wherein said exposed layer composition is devoid of antiblock additives.

4. The process of claim 1 wherein the total thickness of said extruded combined layers is at least about 40 microns and said exposed layer has a thickness of about 3 microns or less.

5. The process of claim 4 wherein said exposed layer has a thickness of about 2 microns or less.

6. The process of claim 5 wherein said exposed layer contains an additive selected from the group consisting of EMA and EVA.

7. The process of claim 6 wherein said exposed layer has a thickness of about 1 micron or less.

8. The process of claim 1 wherein said extruded article is a multilayer film.

9. The process of claim 1 wherein said extruded article is a multilayer fiber.

10. The process of claim 1 wherein at least one of said layers contains a filler in an amount in the range of up to about 80% by weight.

11. The process of claim 10 wherein said extruded article is a multilayer film and including the further step of stretching said film to impart a moisture vapor transmission rate of at least about 300 grams per square meter per 24 hours.

12. The process of claim 11 wherein said imparted moisture vapor transmission rate is at least about 2000 grams per square meter per 24 hours.

13. The process of claim 12 including the further step of forming a laminate by combining said film with a nonwoven layer.

14. The process of claim 1 wherein said exposed layer composition contains an antiblock agent.

15. The process of claim 14 wherein said antiblock is contained in an amount within the range of from about 0.5 to about 5% by weight.

16. The process of claim 15 wherein said antiblock is selected from the group consisting of diatomaceous earth and ground silica.

* * * * *